United States Patent [19]

Jung

[11] Patent Number: 5,312,471
[45] Date of Patent: May 17, 1994

[54] METHOD AND APPARATUS FOR THE MANUFACTURE OF LARGE OPTICAL GRADE SI02 GLASS PREFORMS

[76] Inventor: Lothar Jung, 1355 Plymouth Rd., Bridgewater, N.J. 08807

[21] Appl. No.: 800,941

[22] Filed: Dec. 2, 1991

[51] Int. Cl.$^5$ .................. C03B 19/04; C03B 20/00
[52] U.S. Cl. ................................. 65/18.2; 65/71; 65/302; 65/335; 65/DIG. 8; 373/20; 373/27; 373/63
[58] Field of Search ............... 65/18.2, 71, 302, 335, 65/DIG. 4, DIG. 8, 29; 373/20, 22, 27, 63, 18; 219/121.47

[56] References Cited

U.S. PATENT DOCUMENTS

| | | | |
|---|---|---|---|
| 1,934,634 | 11/1933 | Wiles | 13/9 |
| 2,106,022 | 1/1938 | Seil | 373/63 |
| 3,652,245 | 3/1972 | Jung | 65/157 |
| 3,674,904 | 7/1972 | Jung | 13/20 |
| 3,821,455 | 6/1974 | Greenewald | 373/20 |
| 4,122,293 | 10/1978 | Grigorenko et al. | 373/22 |
| 4,188,201 | 2/1980 | Jung | 65/302 |
| 4,935,046 | 6/1990 | Uchikawa et al. | 65/18.2 |

FOREIGN PATENT DOCUMENTS 236084  5/1986  Fed. Rep. of Germany .
237064  9/1986  Fed. Rep. of Germany ........ 373/27

Primary Examiner—Karen M. Hastings
Attorney, Agent, or Firm—Lorusso & Loud

[57] ABSTRACT

The disclosed process involves the feeding of particulate $SiO_2$ into a rotating cylindrical furnace in which a gas plasma arc has been established, for melting the feed at a temperature of at least 2400° C. The feed rate is regulated so that the rate of growth of the radius of the ingot melt will not exceed the rate at which bubbles move through the melt to the inner cylindrical surface. The preferred apparatus is a rotating horizontal furnace having a pair of opposing hollow electrodes mounted in its opposing end surfaces for establishment of an arc therebetween. A feeding device introduces the $SiO_2$ feed through the open bore of one of the electrodes for melting by the plasma arc.

11 Claims, 4 Drawing Sheets

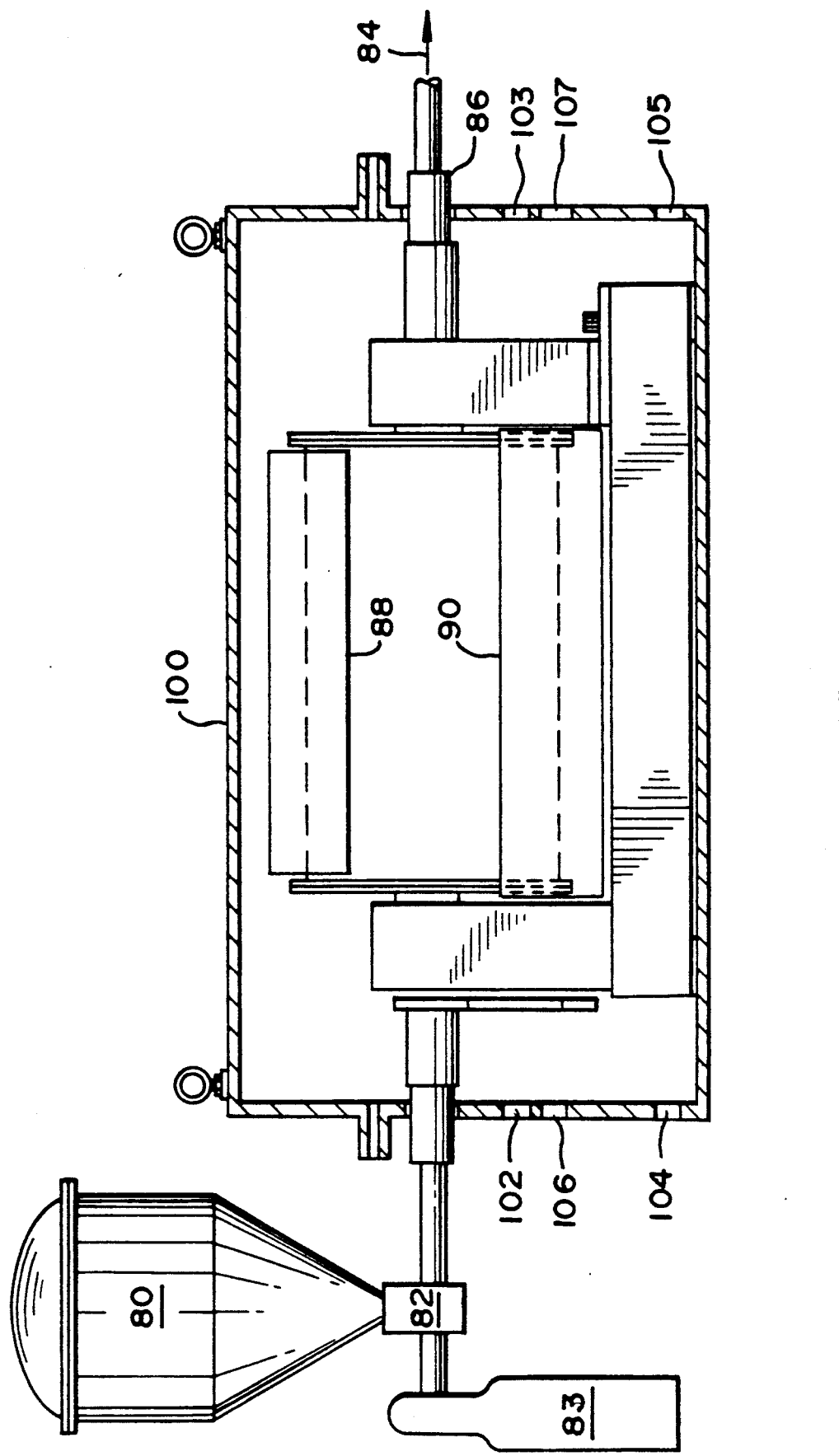

METHOD AND APPARATUS FOR THE MANUFACTURE OF LARGE OPTICAL GRADE SI02 GLASS PREFORMS

BACKGROUND OF THE INVENTION

1. Field of the Invention

This invention relates to the manufacture of $SiO_2$ glass and more specifically to the manufacture of preforms of medium to high purity. In the prior art, this type of material is also dubiously described as "fused quartz" when transparent and as "fused silica" when opaque.

2. Background and Prior Art

Transparent $SiO_2$ glass is always preferred as bubble-free and homogeneous, in other words as an optical grade of high purity, while the opaque type often is used as a lower cost substitute for the above, comprising a lower purity level. Its opaqueness may simultaneously be a requirement when the transmission of visible light from either direction is t be excluded.

Preforms of $SiO_2$ glass are sought both as hollow cylinders and as solid cylinders, with precision dimensions for diameter and wall thickness, if hollow, for drawing to form tubing and rod.

For the manufacture of such preforms, both natural and manmade silica materials are utilized. Natural silicas include granular materials derived through physical and chemical benefication from idiomorphic quartz, such as quartz crystals or xenomorphic vein or pegmatite quartzes. For the opaque type, generally sedimentary quartz sands or lower quartz grades of the above quartzes are used. A composite use of these materials is also not uncommon. Among the manmade silicas are those derived as high purity precipitations and depositions from $SiO_2$ containing solutions and/or vapors.

The tubes and rods produced from the preforms are used in precision shapes for the manufacture of optical components, such as envelopes for high-temperature, high intensity and thus high efficiency lamps. Smaller preforms are used for the manufacture of energy transmitting fibers for optical telecommunications systems.

Another application of the larger preforms is in heat-drawing into large diameter tubes which in turn are utilized as is or converted into high purity containers for use in the manufacture of semiconductor materials, i.e. for holding semiconductor materials in processing steps, such as melting, zone-refining, diffusion or epitaxy. In another variation of their use, the preforms are heat-forged into blocks of different shapes and dimensions from which smaller glass components ar derived by mechanical means, e.g. cutting and grinding.

In the prior art, the manufacture of $SiO_2$ glass is often equated with mere melting of the quartz. In reality, the manufacture involves multiple sequential phases, all of which can contribute significantly toward the quality and the stability of the glass. I have defined the initial $SiO_2$ manufacture as having five consecutive basic phases or stages. These phases occur sequentially, either over a prolonged period of time or they may be developed in such short intervals and such rapid succession that they appear as one:

| Phase 1 Preheating | Phase 2 Melting | Phase 3 Fusing | Phase 4 Equilibrating | Phase 5 Quenching |
|---|---|---|---|---|
| ↓ | ↓ | ↓ | ↓ | ↓ |
| Conversion of α-quartz→ cristobalite, outgassing $T > 1400°$ C. $> 1723°$ C. | Conversion of crystalline into amorphous phase $T > 1427°$ C. | Joining of glass beads or droplets into larger monolith $T > 1427°$ C. | Homogenizing, diffusing, refining $T > 1250°$ C. | Cooling, stabilizing, stress relieving $T < 1050°$ C. |

These phases may then be followed by additional heating phases aiming to achieve specific glass qualities before final shaping by mechanical means, such as cutting and/or grinding.

| Phase 6 Re-Heating | Phase 7 Flowing | Phase 8 Quenching |
|---|---|---|
| ↓ | ↓ | ↓ |
| Softening, homogenizing, diffusing $T > 2000°$ C. | Forming, reshaping, blowing $T > 2000°$ C. | Stabilizing, cooling $T < 1050°$ C. |

Allowing for the wide ranges for the temperatures to be used in combination with different atmospheres, gas pressures and mechanical forces, and allowing for from short to prolonged periods of time, the optical quality of the silicon dioxide glass typically undergoes significant changes during the multitude of processing steps as depicted by, but not limited to, the above phases or operative steps.

Upon completion of phase 5, the equilibria within the $SiO_2$ glass has been defined in phase 4, relative to the temperature, the amounts of dissolved gasses and the bubble content.

In all prior art processes in which the equilibria achieved in phase 1 through phase 5 are permitted to change during or as a consequence of the subsequent treatments of phases 6 through 8, or other past-equilibria treatments, the optical quality of the glass will undergo a change. For example, the prior art processes described in U.S. Pat. Nos. 3,652,245 and 3,674,904 utilize a precharged furnace with an internal resistance heating element for the melting of the surrounding annular layer of granular quartz material, either stationary or with rotation to avoid contact between the heating element and the melt. In both these processes, the melting proceeds radially from the inside to the outside of the granular charge. With the flow of heat, a temperature gradient develops across the thickness of the melt and the melting is thereby non-isothermic. To those skilled in this type of melting, it is known that the temperature on the inner surface of the melt, because of the limitations inherent in the heating element cannot exceed 2000° C., while the outer layer of the melt never exceeds the melting point of cristobalite, i.e. 1723° C.

An inevitable reversal of the above temperature gradient is produced by external heating in the reheating and drawing of the preforms in phases 6 and 7, wherein the temperatures easily exceed 2200° C. As a consequence, bubbles often appear in these zones of the melt formed at lower original equilibrium temperatures. In other words, gases dissolved in the melt at the lower temperatures of the original melt forming temperature gradient become a gas phase when the temperature of the solidified melt, or portions thereof, becomes higher than that at which the gas existed in solution equilibrium in the original melt. Of course, such bubbles are highly detrimental to utilization of the quartz glass in optical applications.

In a similar internal heating and melting process disclosed in GDR Patent No. DD 236,084 A1, the resistance heating element has been replaced with an elongated high powered plasma arc in an attempt to deliver higher temperatures and higher productivity. Unfortunately, while delivering higher temperatures at the inner surface of the melt, it does not do so at the outer surface, with the result that the aforementioned temperature gradient is increased and the process becomes further removed from the isothermic ideal. Identically to the above cited U.S. patents, and despite the higher temperatures of the plasma arc, the highest temperature achieved at the outer layer of the melt is again the 1723° C. melting point of cristobalite.

The specification of GDR D 236,084, suggests that by application of extreme centrifugal forces through rapid rotation of the melt, gas bubbles would be floated to and escape from the inner surface of the melt. However, calculations show that for most of the possible bubble locations within the melt, bubble migration to the inner surface would require unrealistic times. Examinations of such melts confirm concentrated bubble layers approaching the outer surface of the melt, which layers must be removed through wasteful grinding.

The process taught by GDR DD 236,084 use high gaseous pressure within the melting furnace in an attempt to reduce or to eliminate $SiO_2$ vaporization and to facilitate further superheating of the melt. While the higher temperature favorably decreases the dynamic viscosity of the melt and thus increases the mobility of the bubbles, the higher pressure, intended to reduce or eliminate vaporization, is counterproductive in that it also tends to compress and to reduce the size of the bubbles and thus decrease their mobility which is proportional to the square of their radii. Since the path of an escaping bubble leads to the inner layer of the melt, that path increases as the thickness of the melt grows with time. As length of the bubble escape path grows, so does the time required for its elimination at the inner surface of the melt, finally resulting in the impossibility of escape from the melt.

Despite the powerful plasma arc employed in the GDR patent, its usefulness is preconditioned on the furnace precharge providing the insulation which in turn enables attainment of the higher temperatures. In the event that the arc is accidentally extinguished or needs to be reignited on a finished or near finished melt to continue to melt the balance, despite its power, the furnace may never reach sufficient temperature again.

One of my earlier patents, U.S. Pat. No. 4,188,201, describes another internally heated, horizontally rotating melting furnace for silica materials, comprising an elongated combustion flame burner as well as an elongated resistance heating element. In contradistinction to the above precharged furnace types, the apparatus is designed to provide desirable isothermic melting, by which the melt initially forms as a layer of suitable insulating material and the material to be melted and fused is introduced into the furnace as small quantities at suitable intervals through an elongated feeder coextensive with the burner. While this furnace arrangement provides for isothermal melting and thereby overcomes many of the disadvantages of the precharged furnaces described above, its thermal efficiency and the resultant temperatures are lower (about 2000° C., maximum), because of the heat losses through the water cooled burner. Similarly, the alternate elongated resistance heater also has a lower thermal efficiency. The lower temperatures translate into a low equilibrium temperature. In other words, this prior art apparatus is limited to the production of ingots at temperatures significantly below the reheating temperature employed for drawing or otherwise reshaping the ingot. Further, combustion flames using technical gases such as hydrogen, propane, acetylene, etc., all produce large quantities of combustion products through which heat escapes without being utilized for the melting. They also contain undesirable water vapor which leads to the introduction of large amounts of hydroxyl groups (OH) into the melt. The addition of hydroxyl into the silica glass is equal to an impurity addition, which results in increased tendencies for optical inhomogeneity and low temperature stability of tubes and rods and other components because the hydroxyl groups lower the viscosity of the glass.

SUMMARY OF THE INVENTION

Accordingly, it is an object of the present invention to provide an optically superior $SiO_2$ glass ingot in terms of low bubble content and higher equilibrium temperatures than the prior art.

Another object is to provide such a $SiO_2$ glass ingot in which less bubbles will form upon reheating for drawing or other reshaping.

Stated differently, it is an object of the present invention to produce a cylindrical ingot of $SiO_2$ glass wherein the entire ingot (its entire wall thickness) is produced from melt at the same temperature, i.e. isothermally.

Another object of the present invention is to provide for such isothermal ingot production at a temperature significantly above the reheating temperature employed for drawing or otherwise reshaping the ingot.

Yet another object of the present invention is to provide for such high temperature, isothermal ingot production with minimal contamination of the $SiO_2$ glass.

Accordingly, the present invention provides a process wherein particulate $SiO_2$ feed material is introduced into a rotating, cylindrical horizontal furnace for melting therein by a gas plasma arc established between two electrodes mounted at opposite ends of the furnace. The feed is melted in the rotating furnace at a temperature of at least 2400° C. and spreads as it is melted, under the influence of centrifugal force, to form a thin layer of melt. The rate of introduction of the feed into the furnace is controlled so that the rate of the decrease of the inner radius of the melt is no greater than the escape rate through the melt toward the inner cylindrical surface of the melt for the smallest bubble compatible with the desired optical quality of the glass ingot product. If microbubbles as small as 0.0002 cm radius can be eliminated, for all intents and purposes, the ingot production may be considered bubble free. In the typical production run the objective will be to eliminate bubbles having a radius of 0.002 cm and larger. As a practical matter, at a melting temperature of 3000° C. the thickness of the melt can grow radially inward at a rate of 7 mm/minute or less without leaving behind bubbles which would make the ingot product unsuitable for optical applications under current standards. Of course, the rate of addition of SiO₂ material to provide the desired inward radially growth rate will depend upon, initially, the surface area of the inner cylindrical surface of the furnace and, subsequently, on the surface area of the inner cylindrical surface of the growing melt. Accordingly, it is preferred that the rate of introduction of feed be decreased simultaneously with and in proportion to the rate of change of the inner radius of the growing melt. Stated differently, the feed rate will be adjusted downward simultaneously with and in proportion to the rate of decrease of the surface area of the inner surface of the cylindrical melt. Likewise, the speed of rotation of the furnace is preferably increased simultaneously with and in proportion to the rate of decrease of the surface area of the inner surface of the cylindrical melt.

A temperature of at least 2400° C. is the preferred melting temperature from the point of view of obtaining the desired spreading of the feed into a thin layer, from the point of view of to facilitating bubble escape, from the point of view of dissolution of the gas, from the point of view of converting the crystal and feed material into an amorphous product and from the point of view of reducing the viscosity of the melt in order to further facilitate bubble escape. More preferably, the melting temperature will be at least 2750° C. and most preferably at least 3000° C. Typically, the feed will be melted at temperatures within the range of 3000–3500° C. However, the upper temperature is determined solely by equipment limitations and consideration of the fact that the internal pressure of the furnace must be increased as temperature is increased in order to control SiO₂ vaporization, as will later be discussed in more detail.

The particle size of the feed material is not particularly critical but will typically be in the range of −50 to −70 mesh. Caution should be taken in the use of larger particle sizes to avoid driving such particles deep into the melt where they may not melt at the desired high temperature.

As noted above, the process of the present invention is conducted in a rotating furnace whereby centrifugal forces are exerted on the feed material as it enters the furnace and serves to spread the melting feed into a thin layer to facilitate bubble escape. The point of introduction of the feed material is not critical. However, if the preferred apparatus disclosed herein is employed, the feed material is introduced through the central bores of the electrodes, either blown in with the plasma forming gas or mechanically injected through the bore either in the form of a granular feed material or in the form of a slug or pellet. If in the later form, care must be taken that the furnace temperature is sufficiently high and other parameters as such so as to avoid the phenomenm noted above, i.e. the driving of the feed material deep within the melt thereby avoiding exposure to the desired high temperature.

In using the preferred apparatus disclosed herein, after establishing an arc, the power in the arc is gradually increased while a suitable gas such as nitrogen or oxygen is allowed to flow between the two electrodes. The purpose of the gas flow between the two electrodes is to support continuous ionization in the plasma arc and to control its impedance with adjustment of the operating voltage to allow increase in power without increase in current.

In its apparatus aspect, the present invention provides a horizontally mounted, rotatable cylindrical furnace housing closed by a flange at each end to define a sealed furnace interior. A motor drive is provided for rotating the furnace about its central, longitudinal (approximately horizontal) axis. An electrode is mounted in and extends through each of the end flanges of the furnace, into the furnace interior. A power supply is provided for supplying power to the electrodes for the establishment of a plasma arc therebetween. A feeding device is provided for the purpose of introducing a SiO₂ feed through a bore of one of the electrodes for melting by the plasma arc. Preferably, one or both of the electrodes is mounted for movement relative to the other electrode to facilitate establishment of the plasma arc therebetween. The interior of the rotating furnace is lined with an insulating material which may be either a monolithic structure or structures or loose granular refractory material held in place by centrifugal forces.

Depending on the temperature and the rate at which granular material is supplied to the heated furnace interior, it is possible to flatten all grains or agglomerates of the feed to below any tolerable bubble size and to adjust the buoyancy of the emerging bubbles to be much greater than the growth rate of the melt. For a rotating melt, the velocity (v) of a bubble can be calculated in accordance with Stoke's law:

$$V = \frac{2 \cdot \pi \cdot a \cdot \rho_{eff} \cdot r^2}{9 \cdot \eta} \quad \text{I}$$

$$a = 4\pi^2 n^2 \cdot R \quad \text{II}$$

wherein V equals the velocity of a given bubble toward the inner surface of the rotating melt, (a) is the prevailing acceleration caused by the rotation, ($\Sigma_{eff}$), is the density of the SiO₂ glass less the density of the bubble, and (n) equals the furnace rotation in revolutions per minute. (R) equals the distance of a given bubble from the central horizontal axis of the furnace. $F_c$ is the centrifugal force and (r) equals the radius of that bubble. The dynamic viscosity of the melt corresponding to the temperature of the furnace is $\eta$.

$$\rho_{eff} = (2.2 - \rho_{Bubble}) \approx 2.2 \text{ grams/cubic centimeter} \quad \text{III}$$

$$lg\eta = 2.74 \cdot 10^4/T - 6.584$$

T in kelvin

The escape velocities (V) for different size bubbles (r) can now be calculated as a function of the melting temperature (T) and varying distances (R) from the horizontal furnace axis. For example, if the furnace rotation is kept at a constant 1500 RPM, Formula I for V, for different isothermic melting temperatures, becomes:

$$V_{2500° C.} = 1.146 \cdot 10^4 \cdot R \cdot r^2 \text{ [mm/min]}$$

$$V_{3000° C.} = 3.7 \cdot 10^5 \cdot R \cdot r^2 \text{ [mm/min]}$$

$$V_{3300° C.} = 1.5 \cdot 10^7 \cdot R \cdot r^2 \text{ [mm/min]}$$

$$V_{3500° C.} = 3.86 \cdot 10^7 \cdot R \cdot r^2 \text{ [mm/min]}$$

For a melting surface located 5 cm from the central horizontal furnace axis and for a micro-bubble of 0.002 cm radius, the escape velocity is $V_{2500° C.} = 0.23$ mm/min, but at 3000° C., $V_{3000° C.} = 7.4$ mm/min. It follows that at 3000° C., the melt can grow in thickness up to 7 mm/min without bubbles being left behind within the melt.

Increasing the temperature yet further provides the basis for increased melting rates. For example, if the temperature is raised to 3300° C., the resultant velocity $V_{3300°C.} = 299$ mm/min. Temperatures of 3500° C. are possible and desirable. At 3500° C. the equalization and distribution of melted material will take place at unprecedented speed and the viscosity of the $SiO_2$ will be less than 5 while the bubble escape velocity will become $V = 773$ mm/min.

With V equal to the velocity of the bubble and equal to its escape path length the escape time of a bubble thus becomes:

$$t = l/v \qquad \text{V}$$

$$l \rightarrow \text{zero}; \ t \rightarrow \text{zero}$$

As can be seen, elimination from the melt in accordance with the present invention is accomplished by two rather than one effect alone as in, for example, the GDR patent. Namely, the present invention provides both a much higher bubble escape velocity V and an effective reduction to near zero of the escape path length for that bubble. Given a bubble velocity V greater than the rate of reduction of the inner radius of the melt (rate of growth of the wall thickness of the ingot), all bubbles can be eliminated from the melt.

It is needless to say that once the temperature at a given point within the melt is lowered as that point becomes separated farther from the plasma arc by further deposition, no additional bubbles are generated within the melt. Likewise, in subsequent reheating processing phases no bubbles form as long as the reheating temperature remains below the isothermal melting temperature at which the melt was formed.

The present invention provides melting temperatures so high, i.e. at least 3000° C., that they cannot be surpassed by subsequent external heating of that melt or portions of it, as in drawing or other working, which equates with ultimate stability.

By connecting the bore of the hollow electrodes to a source of pressurized gas or by use of a throwing device for the granular silica to be melted and/or fused into a preform, and by connecting the second electrode bore to a throttling valve, the pressure of the furnace interior can be increased without impeding the feeding process.

The high furnace temperatures must be accompanied by furnace pressures equal to or higher than the corresponding vapor pressure of $SiO_2$. The benefit of the increased pressure in the furnace is the elimination of the vaporization of the $SiO_2$ glass and its assistance in the homogenization of the melt, although increasing pressure does adversely affect the mobility of the bubbles to some extent, as is the case in the GDR patent mentioned above.

The $SiO_2$ vaporizes in the following reaction:

$$SiO_2 = SiO + \tfrac{1}{2}O_2 \qquad \text{VI}$$

An equation for the pressure of SiO over a $SiO_2$ glass melt above 2000° K. and under neutral conditions has been published by H. L. Schick in 1960 in "A thermodynamic analysis of the high-temperature vaporization properties of silica", Chem. Rev. 59 (1960), p. 331. The vapor pressure of the SiO can be calculated with the following equation:

$$\ln P_{SiO} = 18.41 - 58175/T$$

with P in atmospheres and T in degrees kelvin. In the preferred temperature range of operation, the following pressures are employed:

| Temperature in °C. | SiO Pressure in atm. |
|---|---|
| 2700 | 0.314 |
| 2800 | 0.594 |
| 2900 | 1.078 |
| 3000 | 1.888 |
| 3100 | 3.20 |
| 3200 | 5.25 |
| 3300 | 8.40 |
| 3400 | 13.08 |
| 3500 | 19.90 |

The present invention provides a completely bubble-free melt even when using granular materials with otherwise prohibitively high gas and liquid contents. Furthermore, the melt is being homogenized at an extremely high rate by its flow (spreading) laterally and horizontally, and thereby achieves an equal melt diameter along the horizontal furnace axis. Another major advantage of this furnace process over the prior art use of pre-charged furnaces is that the present invention can produce a melt of precise inner diameter which needs no additional machining, by weighing the total amount of feed.

The present invention also enables another advantageous modification, heretofore unrealizable, namely the adding of precise, concentric layers of modified $SiO_2$ materials on top of each other. For example, in the manufacture of preforms for optical wave guides by the Modified Chemical Vapor Deposition process or MCVD process, optical quality $SiO_2$ tubes are produced first. A typical tube size is 25 mm outer diameter by 3.0 mm wall by approximately 1200 mm length. In a typical, time-consuming procedure of nearly eight hours, each such tube is then internally vapor coated with germanium and phosphorous doped $SiO_2$ glass and then collapsed into a rod of approximately 12 mm diameter. This rod is called a preform and is used for optical fiber manufacture. The invention can be used to provide a similar preform. Specifically, after reaching the corresponding inner diameter of the melt by melting high purity granular quartz, such as used in the wave guide grade MCVD tubes, the furnace is now charged with the granular manmade doped $SiO_2$ materials identical to those deposited in the MCVD process, but prepared ahead of time by more efficient methods. The rate of their deposition can be identical or even higher than that of the initial crystalline granular feed materials. The present invention provides an intermediary preform at least twenty times the diameter of the current state-of-the-art preform and twice its length in one-sixteenth of the time. This translates to a productivity increase of more than twelve thousand times over the prior art without any loss in quality.

The typical energy consumption for the furnace for the melting of a high optical grade, amounts to no more than 1.5 to 2.0 Kcal/kg of melt. In contrast, the typical energy consumption per kg of melt in combustion flame type melting is at least forty times higher during the actual melting phase alone, not taking into account the additional reheating steps that are necessary to produce an identical size preform. Thus, the present invention provides a heretofore out-of-reach intermediary preform for optical fiber and $SiO_2$ glass tubing manufacture which dramatically reduces cost as compared to the conventional method.

BRIEF DESCRIPTION OF THE DRAWINGS

FIG. 3 is a schematic view of one embodiment of apparatus in accordance with the present invention, inclusive of the furnace of FIG. 1; and FIG. 4 is a schematic view of another embodiment of apparatus in accordance with the present invention.

DESCRIPTION OF THE PREFERRED EMBODIMENTS

Figure 1:
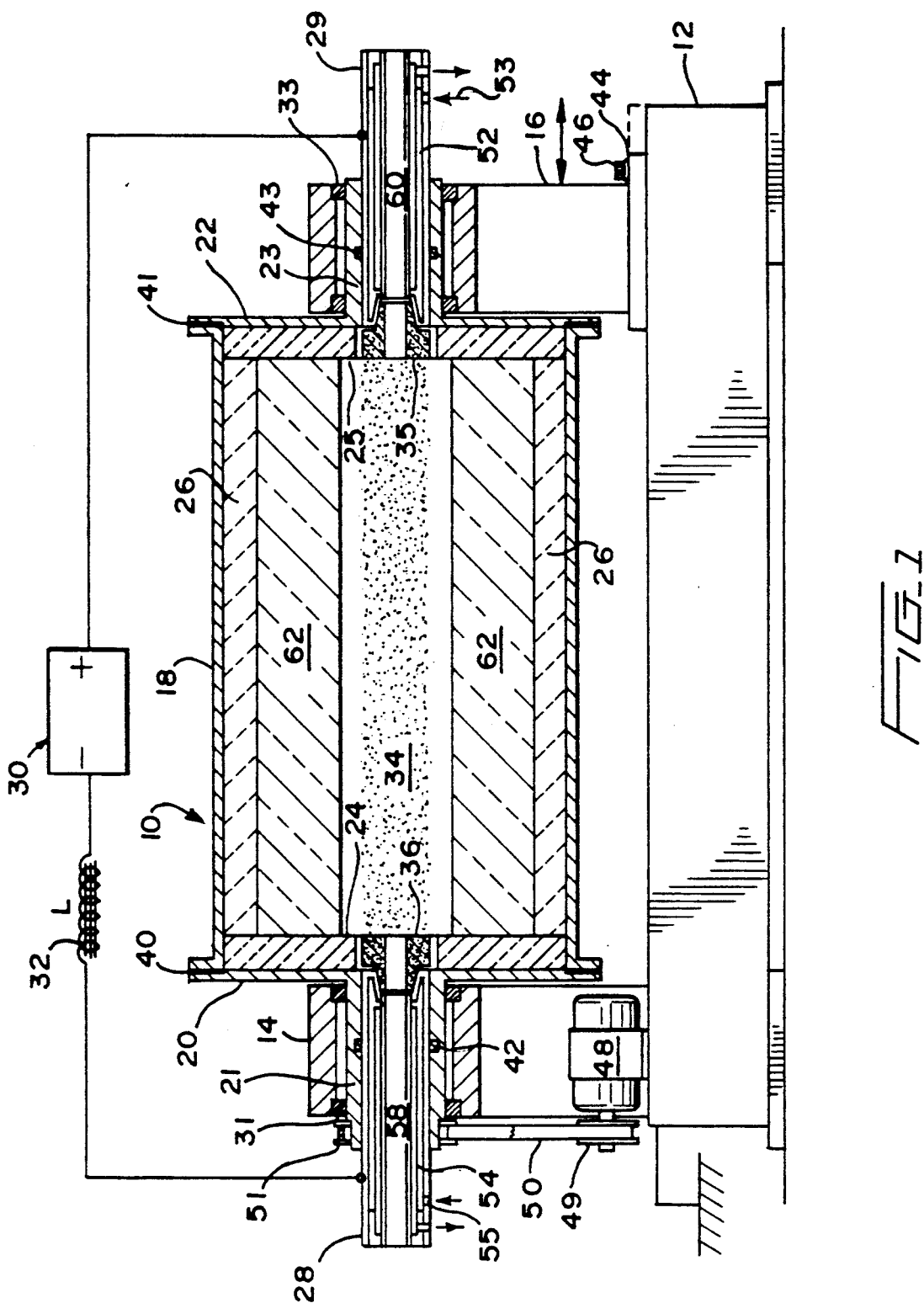
FIG. 1 is a cross-sectional view of an embodiment of a furnace in accordance with the present invention.

FIG. 1 shows one embodiment of a furnace 10 in accordance with the present invention. Furnace 10 is, in some respects, similar to a lathe in that it includes a machine bed 12 with floor mounting pads, a headstock 14 and a tailstock 16. The housing of rotary furnace 10 is made up of three components, a cylindrical section 18, a left-hand flanged cover 20 and a right-hand flanged cover 22. Both flanged covers 20 and 22 are thermally insulated toward the furnace interior, facing the plasma arc, with doughnut-shaped monolithic refractories 24, 25. The insulation 26 covers the interior of the cylindrical section 18 and may be granular or solid (monolithic) in nature. Axial extensions 21, 23 of flanges 20, 22 serve to rotatably support the furnace 10 through ball bearing assemblies 31 and 33. The furnace 10 is hermetically sealed to allow the furnace 10 to operate under vacuum or at elevated pressures. For this purpose gasket-type seals 40, 41 are provided to seal the flanged covers 20, 22 to the cylindrical section 20 and O-rings 42, 43 are provided to seal the electrodes 28, 29 within axial extensions 21, 23.

Both flanged covers 20 and 22 are respectively penetrated by non-rotating, but linearly movable, hollow water-cooled electrodes 28, 29. These non-rotating electrodes 28, 29 are also suitably electrically isolated from (insulated from) the rotating flanges to allow the connection of a high current/high voltage DC power supply. The rotating furnace assembly 10 is grounded.

Any DC power supply 30 can be employed as long as requirements for total power and regulation thereof are met. It has been found that an additional inductor 32, e.g. with an inductance of 10 milli henry, should preferably be added in series with power supply 30 in order to aid in maintaining the stability of the arc 34 by preventing the power to go to zero at any given time during the melting operation. In the event of an unexpected event acting to reduce the current flowing through the arc, the inductor 32 will develop an electromotive force which in turn will act to support the current flowing in the arc. Thus, in contradistinction to the furnace of the GDR patent and its problems of reigniting the arc, the furnace 10 can be shut down and reignited during melting at will. The originally provided insulation 26 makes the restart independent of the unmelted charge balance left within.

The furnace 10, as shown, employs two identical electrodes 28 and 29; however, identity of the electrodes is not a requirement. In many prior art arc furnaces, different size electrodes are used for the anode (larger) and cathode (smaller). Facing the furnace interior both electrodes have been extended with hollow, consumable stubs 36, 37 which may be carbon, e.g. graphite, or other electrically conductive, high temperature refractory or refractory metal such as tungsten.

The tailstock 16 of the furnace is horizontally movable via, e.g. a dovetail slide 44, to facilitate mounting the housing 10 and a lock 46 is provided to hold it in place during rotation.

The rotational drive is provided by a variable speed motor 48 and a drive pulley 49 which powers a belt 50 to drive the driven pulley 51 affixed to the hollow shaft or axial extension 21 which forms part of the left-hand furnace flange 20.

A coolant may be introduced through inlets 53, 55 for circulation through annular passages 52, 54 of the hollow electrodes 28, 29 in order to achieve control of the temperature of electrodes 28, 29.

After rotation of the furnace has been commenced and the furnace atmosphere has been suitably adjusted, the plasma arc is now established between the consumable electrode extensions 36, 37 This can be accomplished in a variety of ways. For example, by motive means 64 (FIG. 3)both electrodes can be moved toward each other and then drawn apart after establishing the arc, one only can be moved or one or two auxiliary electrodes, such as graphite rods, can be inserted through the bores 20 of the large electrodes. If auxiliary electrodes are inserted through the non-rotational electrodes 28, 29 , their diameters will preferably be slightly smaller than the hollow bores of electrodes 28, 29 in order to permit the addition of a small amount of gas such as argon or nitrogen which is beneficial, but not essential, for supporting the plasma arc.

Air can be used to establish the arc, but it is undesirable for operation because of the inevitable electrode oxidation. Argon or other inert gas is the preferred plasma gas both in terms of electrode protection and achievement of a high temperature. The operating voltage, an important factor in high efficiency application of electric power, is low in argon arcs as compared to arcs with diatomic gases such as nitrogen. In the event of $SiO_2$ vaporization and its disassociation, oxygen would be added to the arc but will increase the arc operating voltage. A small flow of argon cleans the atmosphere and thus reduces undesirable increases in the arc voltage. An alternative approach to establishment of stable operation conditions, is to increase argon pressure instead of permitting a flow between the electrodes. The increased pressure above the prevailing vapor pressure reduces the vaporization of the $SiO_2$ and it also increases the arc voltage which becomes very stable. The rotation of the furnace housing also has some effect on the stability of the arc by revolving the gases contained in the furnace, which actually results in a spiraling of the arc between the electrodes and stabilization of the arc by centrifugal forces. Once the arc has been created between the electrodes, they are pulled apart to elongate the arc supported by an initial current of approximately 100 amperes. The elongation of the arc can be accomplished manually or mechanically with linear velocities of up to 7 centimeters per second. After reaching the final electrode positions or after having withdrawn the auxiliary electrodes, with the initial plasma arc firmly established between the main electrodes, additional power is supplied from the DC power supply to increase the temperature to above 1723° C. at the inner surface of the insulating layer of the cylindrical furnace section in order to prepare for receiving a charge for melting. Granular or particulate silica material is now introduced into the furnace through one or both bores of the hollow electrodes. The silica feed may be introduced, into the furnace with the stream of gas that supports the plasma arc, through one of the electrode bores 58, 60. In deviation from the prior art, the exact point of introduction granular feed is not critical because, regardless of the point of introduction, the feed will be melted and liquified to a degree which will allow it to spread to an even cylindrical distribution within the furnace, thus forming a cylindrical melt 62.

By continuously or incrementally adding particulate $SiO_2$ materials in the previously described manner, or by other mechanical means, such as catapulting it through the hollow electrodes, the thickness of the melt gradually increases in the same manner until the maintenance of the plasma arc is no longer feasible, i.e. when an inner diameter (diameter of the hollow) reaches approximately 40 mm.

Optionally, corrosive and reactive gases may be added to the plasma arc atmosphere without affecting its operation, in order to simultaneously purify the particulate feed material before it actually becomes part of the melt. One such preferred reactive gas is chlorine gas. Chlorine gas is known to purify granular quartz at elevated temperatures, including during melting., when added to combustion flames as described in U.S. Pat. No. 3,128,166. However, the addition of chlorine gas impairs combustion efficiency and much of the chlorine gas is lost through combustion. Thus, the addition of chlorine gas in the prior art not only becomes highly wasteful, but also potentially environmentally disastrous if not carefully controlled. In contradistinction, consumption of chlorine gas in the furnace of the present invention remains very low as the total amount added to the furnace atmosphere is less than one percent, and the total amount of gas drawn from the furnace is less than two cubic meters per hour.

Figure 2:
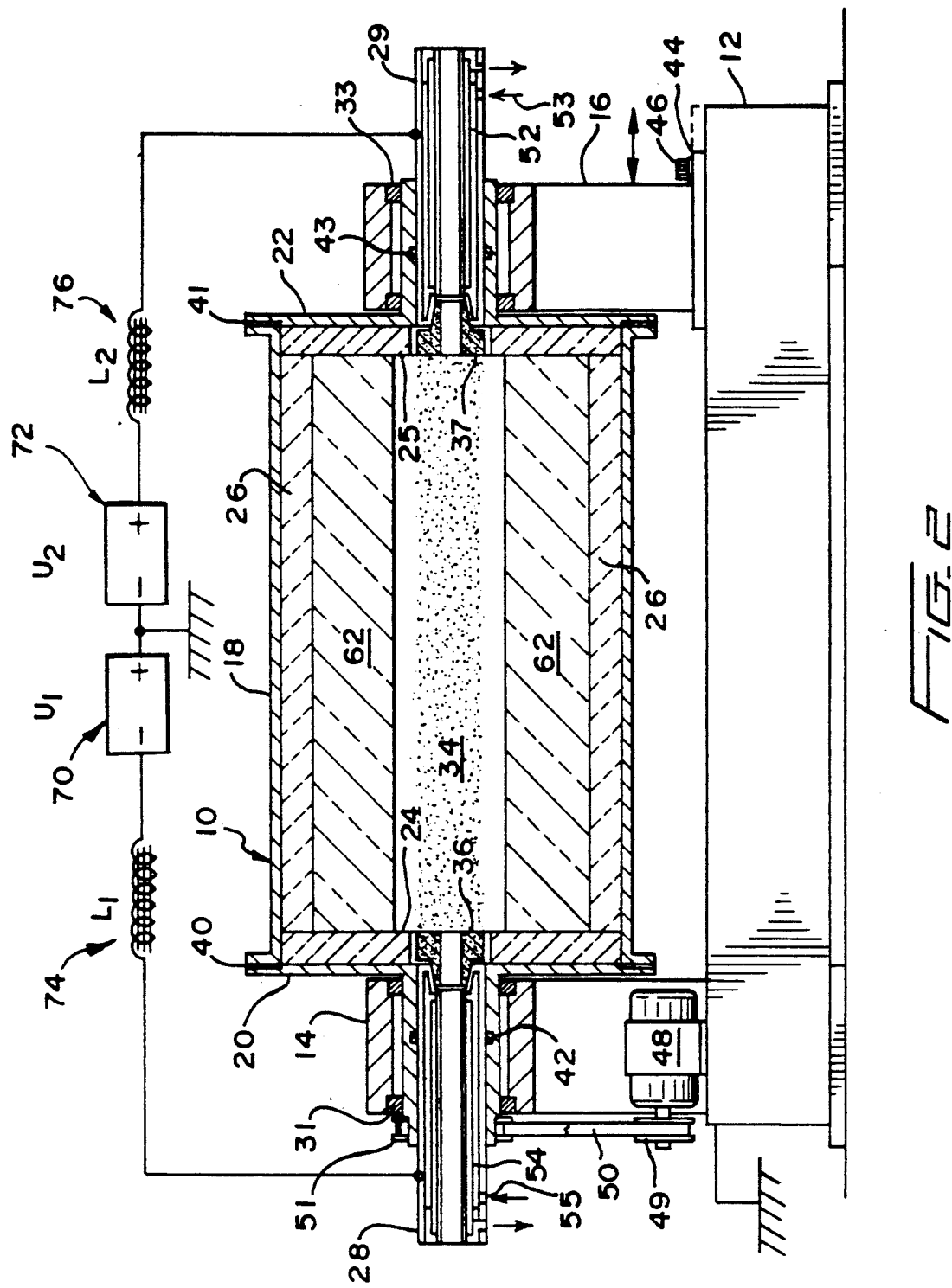
FIG. 2 is a cross-sectional view of another embodiment of a furnace in accordance with the present invention.
Figure 9:
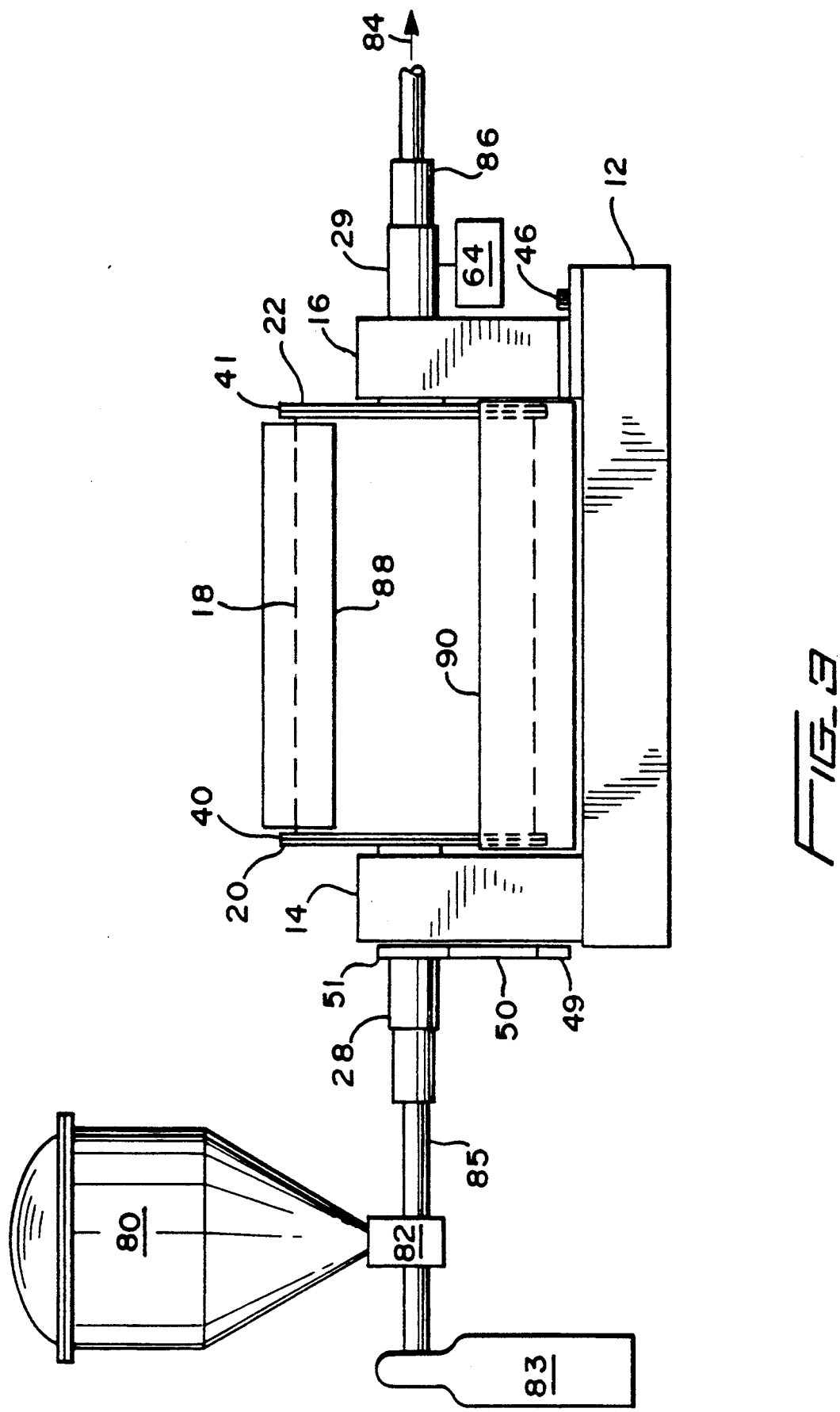

Another preferred embodiment of the furnace of the invention is shown in FIG. 2 in which the electrical hazard of a high voltage potential has been reduced by equally dividing the total necessary voltage between the two electrodes. In the embodiment of FIG. 2, instead of one DC power source 30, two smaller identical DC power supplies 70 and 72 are used, each providing approximately one-half of the total power required. Power supply 70 is connected in series with its own inductor 74 and power supply 72 is connected in series with its inductor 76. Inductors 74 and 76 together equal the necessary total inductance for the complete circuit. The total electrical potential of each electrode against the ground is one-half that of the single power supply. The apparatus of the embodiment of FIG. 2 is otherwise identical to that of FIG. 1.

FIG. 3 shows a complete furnace system in accordance with the present invention. A charge feeder in the form of a manifold valve 82 supplies the furnace 10 with particulate $SiO_2$ raw material received from hopper 80. Protective gas or gases are supplied to the furnace interior through manifold valve 82 from the compressed gas source 83. In passing through the manifold valve 82 the gas picks up the feed material. The gas is discharged at 84 through throttle valve 86. Of course, other feed devices may be substituted for manifold valve 82. For example, in the case of a continuous feed 82 may be a venturi.

In addition to the internally used insulating layer 26 of the embodiments of FIGS. 1 and 2, the embodiment of FIG. 3 includes a cooling system for the furnace housing consisting of a "shower head" type water ejector 88 located parallel to the horizontal furnace axis, directly above the furnace housing 10. The water ejector 88 has a multitude of orifices which are directed at the furnace housing 10. The run-off water is collected in a pan 90 directly below the housing 10 where it can be collected, recycled and passed through a cooling system of its own (not shown). The furnace housing itself is partially submerged in the pan 90 in order to receive additional cooling of its flanges 20 and 22. The purpose of this cooling system is to enable minimization of the thickness of the protective insulating layer 26 within the furnace housing, to aid in the cooling down of the melt and to allow formation of a larger ingot for increased productivity.

FIG. 4 shows yet another preferred embodiment of the invention, in which the entire rotating furnace housing and its drive and electrode system as per FIGS. 1 and 2 have been placed a pressurizable stationary housing 100. The purpose of this design is to avoid the need for pressure-capable and consumable rotating seals between the non-rotating electrodes 28, 29 and the rotating furnace housing 10. Stationary, isolated feedthroughs 102, 103 have been built into this pressurizable, stationary housing 100 to power the plasma arc. Additional feed-throughs have been provided for the cooling water at 104 and the pressurizing gas or gases at 105, for the drive motor at 106 and for signal wires at 107 to allow monitoring of the furnace. A scrubbing system (not shown) for receiving the discharge at 84 from the furnace allows use of corrosive gases in the furnace

EXAMPLE 1

The inner diameter of the insulating material 26 in the furnace 10 is 250 mm and the furnace 10 is rotated at 1500 revolutions per minute. The length between the stationary, hollow water cooled electrodes 28, 29 is 250 centimeters. The consumable electrode extensions 36, 37 here have a diameter of 80 mm and their bore is 25 millimeters, identical to the bore of the electrodes 28, 29.

Upon striking the plasma arc, the initial current is adjusted to approximately 100 amperes. After the arc has been fully elongated and has been anchored between the main electrodes 28, 29, the minimum power needed to sustain the arc, approximately 20 kilowatts, is applied. The flow of argon emanating from the right-hand electrode 28 is adjusted to approximately 1 $m^3$ per hour. The power is then increased to approximately 100 watts/$cm^2$ of starting surface on the insulation layer 26. The total power applied in the interior of the furnace 10 thus becomes approximately 2.0 Megawatts. At 2.0 Megawatts the furnace is operated with more energy input per ingot than any prior art furnace. To allow the temperature of the melt to be raised to 3500° C., the pressure in the furnace must be increased to at least 20 atmospheres in view of with the vapor pressure of $SiO_2$ in order to prevent vaporization. The thickness of the insulation layer determines the heat transfer rate at the initiation of the melting. In this example, the thickness of layer 26 has been adjusted to provide a heat transfer rate of 5 watts/cm² at the highest temperature. , i.e. about 3500° C. Within less than 30 seconds, temperatures in excess of 3000° C. have been reached on the inner surface of insulating layer 26.

Granular melting material is now pneumatically injected through the bore 58 of the left-hand electrode 28 located in flange 20. The stream of particulate quartz is direct toward the center of the furnace, but the direction or target position of the feed stream is not critical. The particulate input may be continuous or discontinuous. The average rate is important and is 10 kg/minute or less initially and is decreased proportionately with the reduction of the surface area of the melt as a result of the decreasing inner diameter. The power is also gradually reduced as that inner diameter decreases, but the furnace revolutions are being increased to maintain constant centrifugal force o the melting surface. Since the furnace charge is being delivered with a stream of gas and the amount of gas thus introduced is greater than the amount of gas being bled from the furnace, the furnace pressure increases in order to maintain a high thermal efficiency. After an amount of material predetermined to provide the desired ingot mass and inner diameter has been fed into the furnace, the power is switched to zero and the melt is allowed to cool below the temperature at which deformation of the melt could occur. From practical experience, this temperature is below 1000° C. The cooling of the preform is through the insulation layer and the time required corresponds to its thermal transfer properties. The rate of cooling can be significantly accelerated by reinserting one or both water-cooled electrodes into the rotating furnace housing to absorb the radiant and convection heats from the melt and to remove the absorbed heat with the cooling water. Utilizing this procedure, the preform can be removed within 20 minutes after power has been set to zero.

The result is a completely bubble-free, low OH-containing preform having a precision flame polished bore. Only a few millimeters of the outer diameter of the resultant ingot need be removed through grinding if a granular insulating material has been used. When using a solid insulating material, the grinding losses are less than half of that required where granular insulating material has been used.

The energy consumed for the preform is equal to or less than 1.7 Kcal/kg of melt. Approximately 3.5 m³ of argon gas is consumed in this example.

EXAMPLE 2

The furnace is rotated at 1500 revolutions per minute while loading furnace 10 with granular insulating material by conventional filling means, for example, using the filling device described in U.S. Pat. No. 4,389,235, to the desired inner diameter. Because of the granularity of the insulating material and in the interest of a fast start of the melting and spreading of the melt, a thin layer of approximately 3–5 mm of granular SiO₂ feed material or a lesser grade is added, using the same feeding device, before igniting the arc. While maintaining all other conditions the same as in Example 1, this small amount of precharged SiO₂ material is allowed to be melted first in a disadvantageous manner until a smooth cylindrical surface has been formed, before commencing deposition of the SiO₂ for forming the ingot. The purposes of this precharging and pre-ingot-forming step are (1) to avoid forming a irregular surface such as is formed using a granular insulating material and (2) to separate the granular insulation and its impurities from the high purity granular melting material. Since all melts produced by internal heating require machining of their outer diameter, equivalent to removing the indentations and irregularities left behind by the insulation or unmelted materials, this step is advantageous as it decreases the time before actual melting can be initiated. The melting charge is next introduced in small quantities, followed by the phases heating, melting and flowing to obtain an even melt distribution. For all intents and purposes, the starting diameter (outer diameter) of the melt is still $D_0 = 250$ mm.

Within less than 10 seconds a quantity $q = 2000$ grams of granular melting quartz is introduced. That quantity is melted and spread to an even distribution within an additional 50 seconds. The inner diameter of the melt has since grown to a new diameter of $D_{1\,min} = 249$ mm according to the following equation:

$$(D^2_0 - D^2_{1min}) \cdot \pi/4 \cdot \rho_{2.2} \cdot l_f = q$$

$\rho_{2.2}$ equals the density of SiO₂ glass as 2.2 grams per cubic centimeter and $l_f$ equals the length of the furnace 10, i.e. 250 cm. The increase in the wall thickness of the melt amounts to one-half of that, namely 0.5 mm, corresponding to an hourly melting rate of 120 kg per hour. These temperature and rotation conditions allow for a bubble mobility toward the inner surface (hollow) of the melt of $V \approx 5$ mm per min for bubbles $<0.02$ mm radius and 2 centimeters from the axis of the furnace and thus for complete escape.

The foregoing procedure i repeated with decreasing quantities q during the same period of time, while simultaneously decreasing the total power of the furnace but maintaining the same energy density and increasing the revolutions per minute of the furnace in order to maintain constant forces on the surface of the melt until its final diameter has been reached.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for producing an optical quality SiO₂ glass ingot comprising:
    rotating a cylindrical horizontal furnace about its central axis, said furnace having spaced electrodes extending along said central axis into the furnace interior;
    establishing a gas plasma arc between said electrodes to heat the furnace;
    feeding SiO₂ into said furnace and melting said SiO₂, within said furnace at a temperature of at least 2400° C. to form a hollow cylindrical melt by centrifugal force generated by said rotating, while controlling the rate of said feeding to provide a rate of decrease of the inner radius of said cylindrical melt no greater than the escape rate toward the inner cylindrical surface of said melt at said temperature for the smallest bubble compatible with the desired optical quality of the glass ingot product, said rate of said feeding being decreased in proportion to the rate of change of surface area of the inner surface of the hollow cylindrical melt.

2. The process of claim 1 employing electrodes with central bores and wherein said particulate $SiO_2$ is blown into said furnace with introduction of the gas forming the plasma through one of said electrodes while bleeding gas out of said furnace through the other of said electrodes.

3. The process of claim 1 wherein the speed of rotation of the furnace is increased simultaneously with and in proportion to the rate of decrease of the surface area of the inner surface of the cylindrical melt.

4. The process of claim 1 wherein said temperature is at least 3000° C.

5. The process of claim 1 wherein said gas plasma arc is established by continuously introducing a plasma forming gas into the furnace.

6. The process of claim 5 wherein said plasma forming gas is argon.

7. The process of claim 1 wherein said $SiO_2$ is fed into the furnace in granular form.

8. The process of claim 1 wherein said $SiO_2$ is fed into the furnace in the form of slugs.

9. Apparatus for producing an optical grade $SiO_2$ glass ingot, said apparatus comprising:
    a cylindrical furnace housing closed by a flange at each end to define a sealed furnace interior;
    a loose granular refractory lining the interior surface of said furnace housing and held in place by centrifugal force generated by rotation of said cylindrical furnace housing;
    means for rotating said furnace housing about its central longitudinal axis with said axis approximately horizontal;
    a pair of electrodes, said electrodes having axial bores and extending through said flanges into said furnace interior;
    power supply means for supplying power to said electrodes to establish a plasma arc therebetween; and
    means for introducing a $SiO_2$ feed through a bore of one of said electrodes for melting by said plasma arc and for controlling the rate of said feed to decrease in proportion to rate of change of surface area of the inner surface of a hollow cylindrical melt formed by melting the feed and to provide a rate of decrease of the inner radius of said cylindrical melt no greater than the escape rate toward the inner cylindrical surface of said melt of the smallest bubble compatible with the desired optical quality of the glass ingot product.

10. The apparatus of claim 9 further comprising means for moving at least one of said electrodes relative to the other of said electrodes to facilitate establishment of said plasma arc therebetween.

11. The apparatus of claim 9 further comprising means for continuously introducing a plasma forming gas into said furnace.

* * * * *